(12) United States Patent
Li et al.

(10) Patent No.: US 11,546,473 B2
(45) Date of Patent: Jan. 3, 2023

(54) DYNAMIC CONTROL OF VOLUME LEVELS FOR PARTICIPANTS OF A VIDEO CONFERENCE

(71) Applicant: Lenovo (Singapore) Pte. Ltd., Singapore (SG)

(72) Inventors: Scott Wentao Li, Cary, NC (US); Robert James Norton, Jr., Raleigh, NC (US); Robert J. Kapinos, Durham, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/189,036

(22) Filed: Mar. 1, 2021

(65) Prior Publication Data
US 2022/0279073 A1   Sep. 1, 2022

(51) Int. Cl.
*H04M 3/56* (2006.01)
*H04N 7/14* (2006.01)
*G06F 3/16* (2006.01)

(52) U.S. Cl.
CPC ............ *H04M 3/568* (2013.01); *G06F 3/165* (2013.01); *H04M 3/565* (2013.01); *H04N 7/147* (2013.01)

(58) Field of Classification Search
USPC ....................................................... 348/14.08
See application file for complete search history.

(56) References Cited

U.S. PATENT DOCUMENTS

| 10,652,396 B2 * | 5/2020 | Koster .................. H04M 3/568 |
| 10,652,655 B1 * | 5/2020 | Weldemariam ........ H04R 27/00 |
| 2011/0044474 A1 * | 2/2011 | Grover .................... H04M 3/40 379/202.01 |
| 2013/0227437 A1 * | 8/2013 | Brody ..................... H04L 51/04 715/757 |

FOREIGN PATENT DOCUMENTS

JP    2009027239 A  *  2/2009

\* cited by examiner

*Primary Examiner* — Amal S Zenati
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to facilitate a video conference and to determine different volume levels at which audio for different conference participants should be set. Each different volume level may be greater than zero. The instructions may also be executable to, based on the determination, control audio for the video conference according to the different volume levels. The determination may be based on something other than one of the conference participants specifying one or more of the different volume levels.

20 Claims, 6 Drawing Sheets

DYNAMIC CONTROL OF VOLUME LEVELS FOR PARTICIPANTS OF A VIDEO CONFERENCE

FIELD

The disclosure below relates to technically inventive, non-routine solutions that are necessarily rooted in computer technology and that produce concrete technical improvements. In particular, the disclosure below relates to techniques for dynamic control of volume levels for participants of a video conference.

BACKGROUND

As recognized herein, electronic video conferences can present a different set issues than in-person conferences. For instance, because video conference participants are located remotely from each other, each participant might not pick up on cues as they otherwise would, and this can lead to two or more people unintentionally speaking over each other at an unmanageable level. This in turn can make the conversation difficult to follow and lead to other conference participants missing some of what was said. As also recognized herein, current video conference systems do not have the technical capability to handle these types of issues on their own. Thus, there are currently no adequate solutions to the foregoing computer-related, technological problems.

SUMMARY

Accordingly, in one aspect a first device includes at least one processor and storage accessible to the at least one processor. The storage includes instructions executable by the at least one processor to facilitate a video conference and to determine different volume levels at which audio for different conference participants should be set. Each different volume level is greater than zero. The instructions are also executable to, based on the determination, control audio for the video conference according to the different volume levels.

In some example implementations, the different volume levels may be determined based on different assigned roles of the different conference participants, such as different assigned roles associated with different levels of an organizational hierarchy. So, for example, a first conference participant of the different conference participants may have a higher ranking in the organizational hierarchy than a second conference participant of the different conference participants, and a first non-zero volume level may be determined for the first conference participant that is higher than a second non-zero volume level determined for the second conference participant based on the first participant having the higher ranking in the organizational hierarchy. Also in some implementations according to this example, the instructions may be executable to determine that the first conference participant has stopped speaking for a threshold amount of time and, responsive to the determination that the first conference participant has stopped speaking for the threshold amount of time, raise the current volume level for audio of the second conference participant from the second non-zero volume level to a third non-zero volume level greater than the second non-zero volume level. The third non-zero volume level may be equal to the first non-zero volume level in certain examples.

Still further, in some example implementations the different volume levels may be dynamically determined, e.g., based on a current time of day. Additionally or alternatively, the different volume levels may be determined based on a predetermined point in the video conference being reached. The predetermined point may be indicated in an agenda or calendar entry associated with the video conference.

Still further, in some example embodiments the different volume levels may be determined based on a first conference participant of the different conference participants speaking first before a second conference participant of the different conference participants at a given segment of the video conference.

Additionally, in some examples the first device may include a server and the server may control the audio for the video conference as output by second and third devices different from the server.

In another aspect, a method includes facilitating a video conference and determining different volume levels at which audio for different conference participants should be output. The method also includes controlling audio for the video conference according to the different volume levels based on the determining.

Each different volume level may be greater than zero.

Additionally, the respective volume levels for the different conference participants may each vary over time during the video conference based on one or more parameters identified by a device facilitating the video conference. The one or more parameters may include, for example, a current time of day, a predefined segment of the video conference being reached, and a higher-ranking conference participant currently speaking.

In some example implementations, the method may be performed at least in part by a server that controls audio for the video conference. Additionally or alternatively, the method may be performed at least in part by an end-user device that controls audio for the video conference.

In still another aspect, at least one computer readable storage medium (CRSM) that is not a transitory signal includes instructions executable by at least one processor to determine different volume levels at which audio for different video conference participants should be set. Each different volume level is greater than zero and the determination is based on something other than one of the video conference participants specifying one or more of the different volume levels. The instructions are also executable to, based on the determination, set audio for a first video conference participant at a first non-zero volume level and set audio for a second video conference participant at a second non-zero volume level.

In one example implementation, the determination may be a first determination performed at a first time and the instructions may be executable to, based on the first determination, control audio for the first and second video conference participants according to the respective first and second non-zero volume levels during a first portion of the video conference. In this example implementation, the instructions may then be executable to perform a second determination at a second time after the first time, where the second determination may determine a same non-zero volume level at which audio for the first video conference participant and the second video conference participant should be set. The second determination may also be based on something other than one of the video conference participants specifying the same non-zero volume level. Then instructions may then be executable to, based on the second determination, set audio for a first video conference participant and the second video conference participant at the same non-zero volume level and control audio for the first and second video conference participants according to the same non-zero volume level during a second portion of the video conference occurring after the first portion of the video conference.

The details of present principles, both as to their structure and operation, can best be understood in reference to the accompanying drawings, in which like reference numerals refer to like parts, and in which:

DETAILED DESCRIPTION

Among other things, the disclosure below discusses a hierarchy-based conference management system where audio volume mapping may be performed based on a hierarchy (e.g., based on organization structure) and assigned to each meeting participant. Thus, an audio volume weight may be assigned, based on the hierarchical mapping, to each meeting participant and may be dynamically adjusted based on certain conditions such as a certain time or point in the meeting being reached or which participant is currently speaking. However, in some examples the adjustment trigger condition may be predefined as well. The hierarchy-based audio mapping may thus minimize speech collisions during the meeting that have become far too rampant specifically in video conferences.

As a use case, suppose a video conference begins. A teacher's audio volume may be assigned a weight of 100% for the first 5 minutes while each student's audio volume may be assigned a weight of 30% so that the students are not able to be heard as well as the teacher during the 5-minute window, should they speak. Also, during this time when the teacher is speaking, a teacher's assistant's (TA's) audio volume weight may be set at 100%. Then even at a later time when the TA is speaking, the teacher's audio volume weight may be maintained at 100% and each student's audio volume weight may be maintained at 30%.

But at an even later time when both the teacher and TA stop speaking, students may have their audio volume mapped to 100%. Then, should a first student speak first from among plural students, the first student's volume level may be dynamically adjusted up to 100% while a subsequent student speaker may be assigned a volume level of 50% even if the subsequent student is detected as simultaneously speaking along with the first student.

Then at an even later time, (e.g., near the end of meeting during free discussion), everyone's audio volume weight may be changed to 100%. Then, should one person speak first, that person's volume weight may be maintained at 100% while subsequent speakers and/or other people may be assigned a volume weight of 50% at least while the first person continues to speak. Thus, both a hierarchy and trigger conditions may be used to dynamically change the audio volume mapping.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
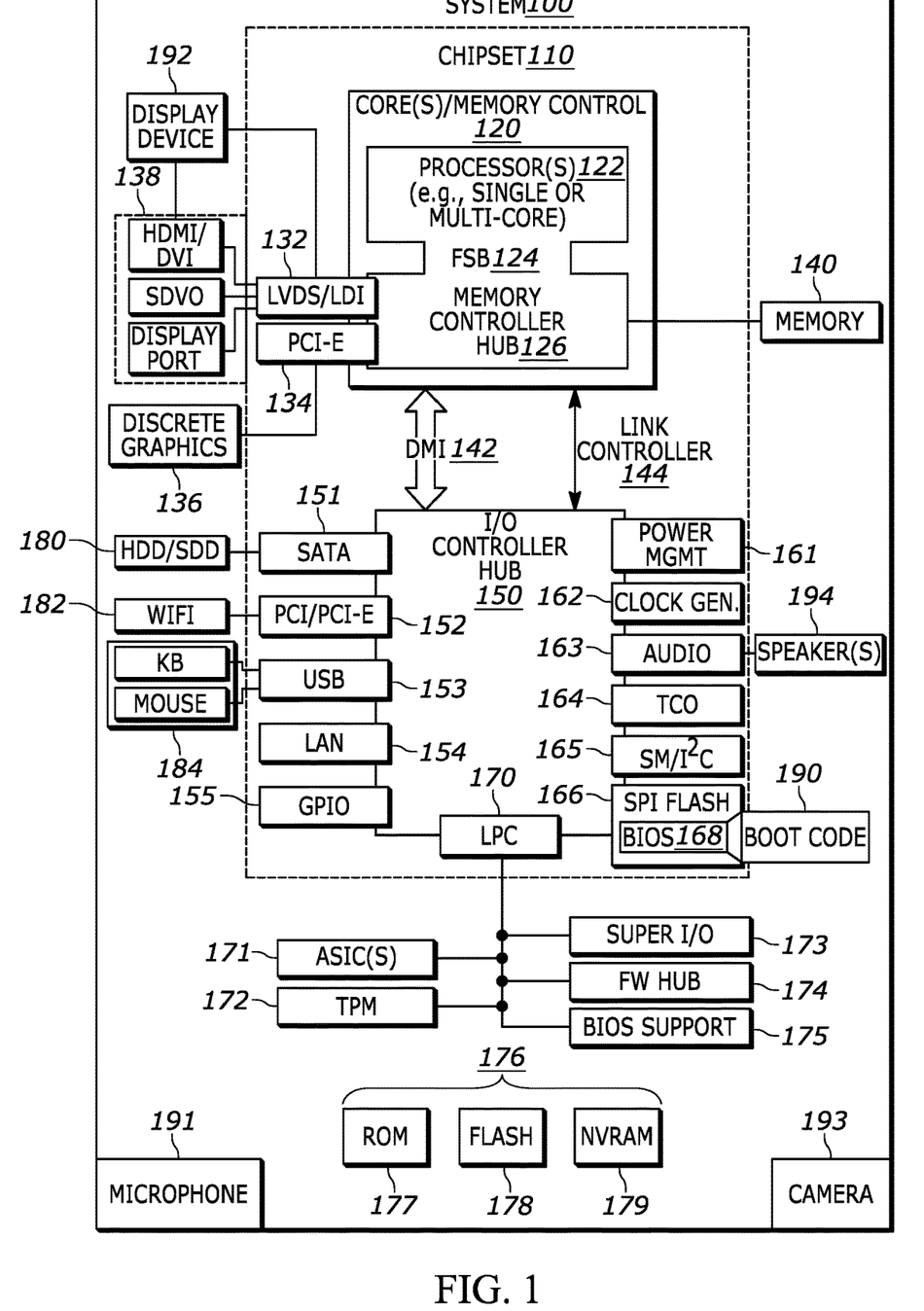
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 191 that provides input from the microphone 191 to the processor 122 based on audio that is detected, such as via a user providing audible input to the microphone as part of a video conference consistent with present principles. The system 100 may also include a camera 193 that gathers one or more images and provides the images and related input to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather still images and/or video such as for video conferencing consistent with present principles.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
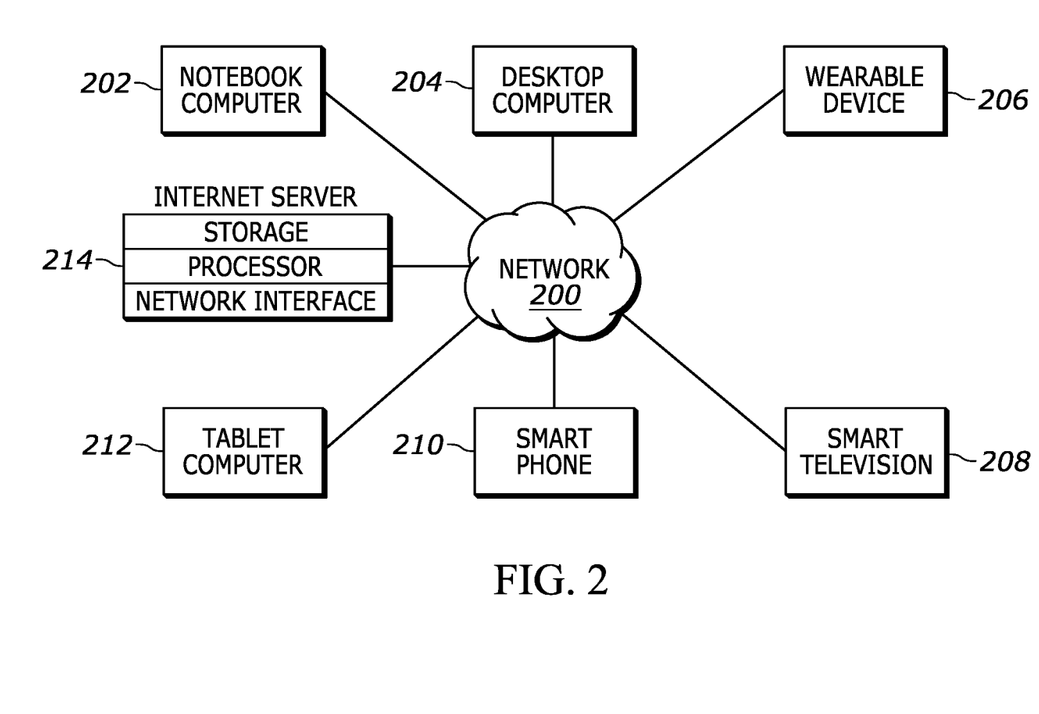
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles (including video conferencing).

Figure 3:
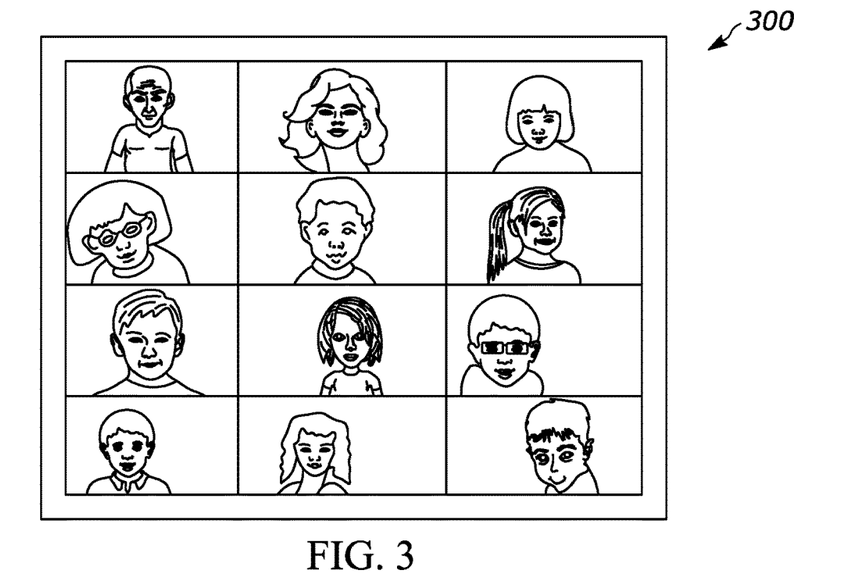
FIG. 3 shows an example video conference graphical user interface (GUI) showing respective real-time video feeds of various video conference participants in separate boxes consistent with present principles.

Referring now to FIG. 3, it shows an example video conference graphical user interface (GUI) 300 that may be presented on a display of a client device. The client device may be facilitating a video conference with other client devices at least by providing a local real-time video feed of a local video conference participant and a local real-time audio/microphone feed of the local video conference participant to remotely-located participants. The remotely-located participants themselves are shown on the GUI 300 via respective real-time video feeds as presented in the separate boxes shown.

Figure 4:
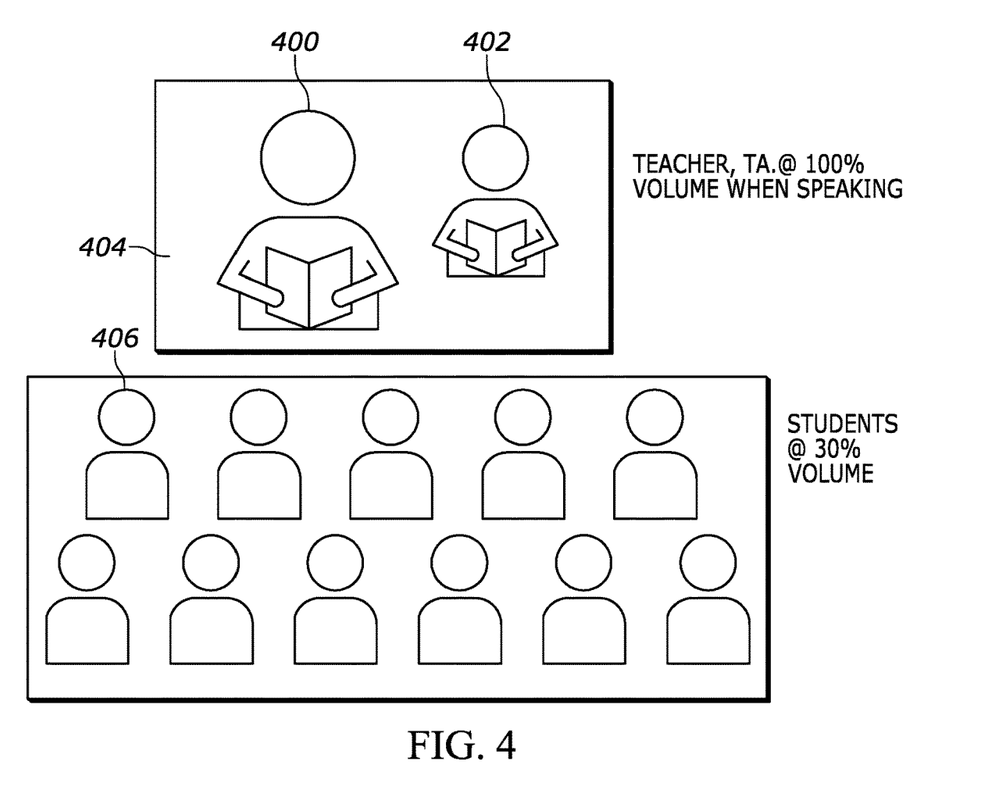
FIG. 4 shows an example schematic diagram of an example scenario involving a teacher, teacher's assistant, and student consistent with present principles s.

Moving on to FIG. 4, it shows an example schematic diagram consistent with present principles. As shown, a teacher 400 and teacher's assistant (TA) 402 are shown as being disposed at a common real-world location 404 such as a classroom, study hall, etc. (thought present principles may apply in other situations as well, such as a video conference for a business meeting). As also shown in FIG. 4, two or more students 406 are also shown and are assumed to be video conferencing with each other and with the teacher 400 and TA 402 concurrently as part of the same video conference. Note that the students 406 themselves might not be commonly-located at a single location and might instead be located remotely from other participants and from the location 404 itself. For example, each student 406 may be located in his or her own personal residence, spaced from other students 406 and the location 404 by possibly miles and thus not being in line of sight of each other.

It is to also be understood that each student 406 may be using his or her own personal or client device to present a GUI similar to the GUI 300 that shows the real-time video feeds of the other respective conference participants, including the teacher 400 and TA 402 and other students 406.

Still in reference to FIG. 4, suppose a teacher has input an electronic agenda to the video conferencing system (as may be hosted by a remotely-located cloud server), or has provided the video conferencing system with access to an electronic calendar or specific electronic calendar entry that indicates an agenda for the video conference. In either case, the calendar or agenda may indicate amounts of time that each segment or portion of the conference is scheduled to take, and/or a specific time of day at which each different segment or portion of the conference is scheduled to begin. The video conferencing system may also have access to organizational hierarchy information or other rankings that rank the participants in a hierarchy that may then be used for determining different volume levels for the participants during the different segments as will be described in greater detail later.

But still in reference to FIG. 4, for the purposes of this example assume that the teacher 400 and TA 402 have a higher rank than the students 406 based on the organizational hierarchy information. Based on this, the teacher 400 and TA 402 may be assigned a higher volume level for the output of their corresponding audio at the speakers of the other devices of the other participants (such as the students 406) than the volume levels at which audio for the students 406 themselves is set to be output at other respective devices. Each conference participant's audio volume level during a given segment of the video conference may therefore be set by the video conferencing system according to the respective participant's position within the hierarchy.

The video conferencing system running at the server to facilitate the video conference may control audio for the video conference according to the different volume levels by receiving microphone input from each user's personal device and adjusting the gain of the input up or down at the mixing stage to set the audio to the appropriate volume level for that person prior to streaming the audio for that person to other respective conference devices. Additionally, or alternatively, the video conferencing system may provide a command to each respective client device's conferencing application executing locally at the respective device to set the appropriate volume output level for the associated participant locally at the respective device. Still further, in some examples the application executing at the associated user's device itself may be controlled to adjust the gain of the local microphone to conform to the set volume level prior to the audio from that microphone being streamed to others (possibly after mixing on the back end by the system/server itself).

In any case, as shown in the example of FIG. 4, the teacher 400 and TA 402 have had their associated volume levels set to an assigned volume level of 100 on a scale from 0 to 100, though any appropriate volume scale may be used consistent with present principles. Also, based on the rankings discussed above, the students 406 have each been assigned a volume level of 30 on the same scale as the teacher 400 and TA 402. Thus, any given student 406 may hear, at their own personal device, the teacher 400 and TA 402 speaking at a volume level of 100 and hear other students 406 speaking at a volume level of 30, should any of them choose to speak while the teacher 400 and/or TA 402 were speaking. In this way, if some of the students 406 start to speak out of turn or amongst each other, other students 406 may still be able to sufficiently hear the teacher 400 and/or TA 402 notwithstanding.

Figure 5:
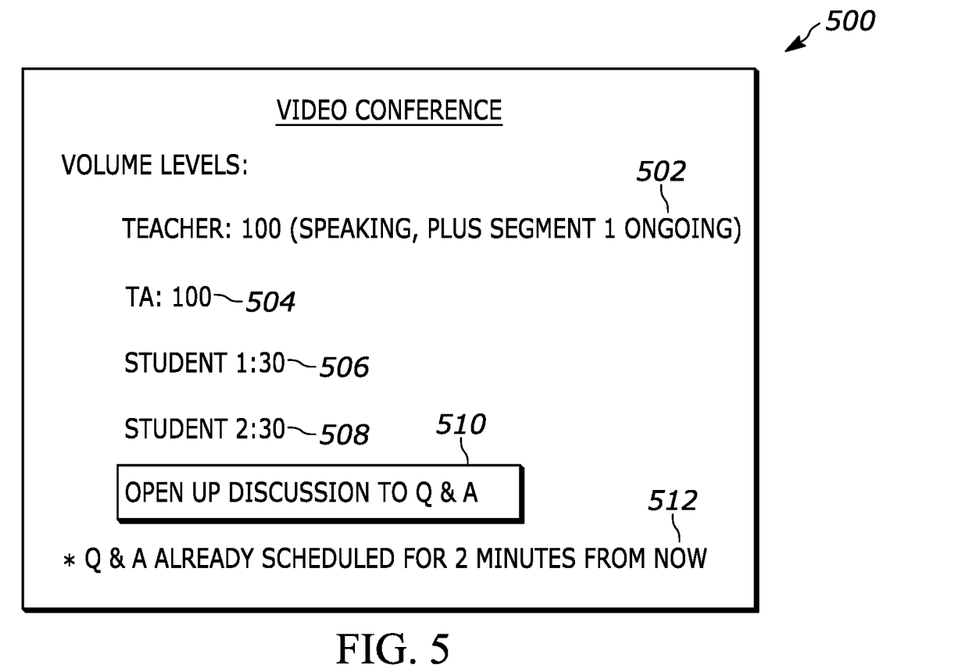
FIGS. 5 and 6 show example GUIs that may be presented on one or more video conference devices during a video conference to indicate various volume levels of various participants consistent with present principles.

Now in reference to FIG. 5, it shows an example GUI 500 that may be presented on the display of the personal device for the teacher 400 or TA 402 according to the example above during a first segment of the conference in which they are scheduled to speak and the students 406 are scheduled to listen. As shown, the GUI 500 may include respective indications 502-508 of the volume level at which each respective participant's audio is set for output at other respective participant devices.

Thus, as shown the indication 502 for the teacher 400 indicates a volume output level of 100 and also indicates, based on the system identifying the teacher 400 in particular as speaking (e.g., using voice recognition software), that the teacher 400 is in fact the currently-speaking participant. As also shown, in some examples the indication 502 may also indicate a reason for the volume level of the teacher 400 being set to 100, which in this case is that segment one of the video conference is ongoing and that the teacher 400 is the scheduled speaker during that segment. Similar reasons for the volume levels of others may also be presented as part of their respective indications 504-508 as well, though they are not shown in the present example for simplicity.

As further shown in FIG. 5, the indication 504 may indicate that the TA 402 has been assigned a volume level of 100 for segment one while various students (including "Student 1" and "Student 2") have been assigned a volume level of 30 for segment one. Note that formal first and last names of each participant may replace the generic identifiers shown for each participant, if desired.

Additionally, the GUI 500 may include a selector 510 that may be selectable via touch or cursor input in order to transition to a second segment of the same conference corresponding to a question-and-answer session. Thus, selection of the selector 500 may command the system to transition to the second segment and possibly adjust the volume levels for each participant accordingly. But also note that an indication 512 may also be presented on the GUI 500 and indicate that the second segment is already scheduled to begin two minutes from the current time of day. Time of day itself may be monitored using a clock application that the system is executing. Thus, the system may track the current time of day and use the electronic calendar or electronic agenda information described above in order to generate the indication 512 and change it in real time as time goes on.

Figure 6:
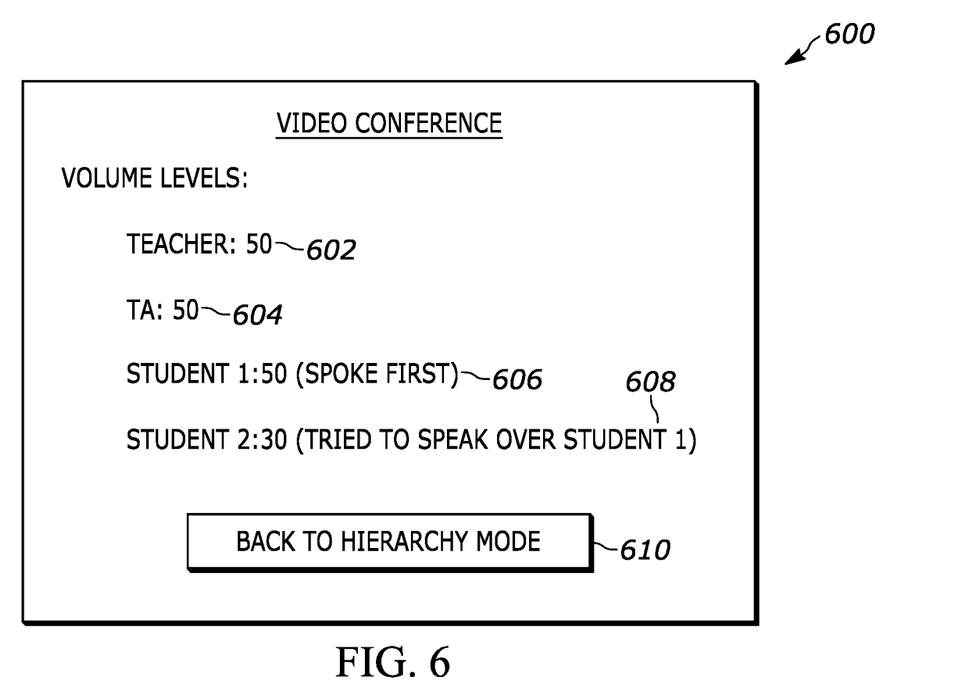

Before describing FIG. 6, further note in relation to FIG. 5 that a GUI similar to the GUI 500 may be presented at each respective participant's device to indicate the current volume levels of other participants. For example, a similar GUI may be presented on each student's device. However, those GUIs might not include the selector 510, which may only be presented at the device of the conference organizer, presenter, person in charge, etc. so that that person may maintain control over volume levels for each participant.

Now in reference to FIG. 6, suppose a predetermined point in the conference has been reached, such as the second segment referenced above. Again, it may have been reached based on selection of the selector 510 or a scheduled time transpiring as indicated in the electronic calendar or agenda information. Based on this, the GUI 500 of FIG. 5 may transform into the GUI 600 of FIG. 6.

As shown in FIG. 6, the GUI 600 may include volume level indications 602-608 indicating the respective volume levels at which each participant's conference audio is currently set for the second segment. Specifically, in this example the teacher 400, TA 402, and Student 1 have each been assigned a volume level of 50 while Student 2 has been assigned a volume level of 30. However, note according to this example that each and every participant's volume level might have been initially set to a same non-zero volume level upon entering the second segment of the conference but that during the second segment Student 1 began speaking first before Student 2. However, Student 2 then started speaking while Student 1 was still actively speaking during the second segment. Based on the conferencing system identifying as much (e.g., using a digital assistant and/or voice recognition), Student 1's volume level may be maintained at 50 (the initial level for the second segment) but Student 2's volume level may be re-set to a lower volume level of 30 until Student 1 is identified as no longer speaking for at least a threshold amount of time. Then when Student 1 has been identified as having stopped speaking for the threshold amount of time, Student 2's volume level may be raised back to 50. The threshold amount of time may be five seconds, for example, and may be configurable by the organizer or presenter for the video conference or even a system administrator.

The system itself may monitor the threshold amount of time based on microphone input for Student 1 indicating no audio or at least no speaking for the threshold amount of time, as may be determined using voice recognition, a digital assistant, speech to text software, etc. Additionally, or alternatively, the system may monitor the threshold amount of time based on camera input showing Student 1 being analyzed using action recognition to identify the student's mouth as no longer moving for the threshold amount of time.

As shown in FIG. 6, the indications 606 and 608 may be adjusted to indicate the foregoing situation. Specifically, as shown the indication 606 for Student 1 may indicate that he or she spoke first, and the indication 608 for Student 2 may indicate that he or she tried to speak over Student 1 which is why Student 2's volume level has been adjusted down to 30. However, also note here that regardless of Student 1 and/or Student 2 speaking at the same time (and hence Student 2's volume level being adjusted down), the volume levels for the audio of the teacher 400 and TA 402 may remain at 50 regardless. This might be based on system settings and/or based on them being ranked higher in the organizational hierarchy used by the system so that, should they start speaking while one of the students is still speaking, their volume levels would not be adjusted down.

Also note that in some examples the threshold amount of time referenced above may apply to anyone that has stopped speaking for the threshold amount of time, sometimes regardless of segment. For example, if the teacher 400 were to stop speaking during segment one for the threshold amount of time, the volume level for each student's audio may be raised to be equal to the teacher's volume level or may at least be raised to be higher than it was (such as being raised from 30 to 50) even if still less than the teacher's volume level. Then if the system were to identify the teacher 400 as beginning to speak again during that segment, the volume level of the students may be adjusted back down to a volume level of 30 or whatever volume level the system would otherwise set them at for while the teacher 400 were speaking as part of segment one.

In any case, but still in reference to FIG. 6, also note that the GUI 600 may include a selector 610. The selector 610 may be selectable to command the system to revert back to the volume settings for segment one, where the different volume levels were determined based on organizational hierarchy or rankings so that higher-ranked people had higher volume levels than lower-ranked people. Thus, by selecting the selector 610, the teacher may dynamically adjust the volume levels for all participants with a single selection of the selector 610 (even during a different segment).

Figure 7:
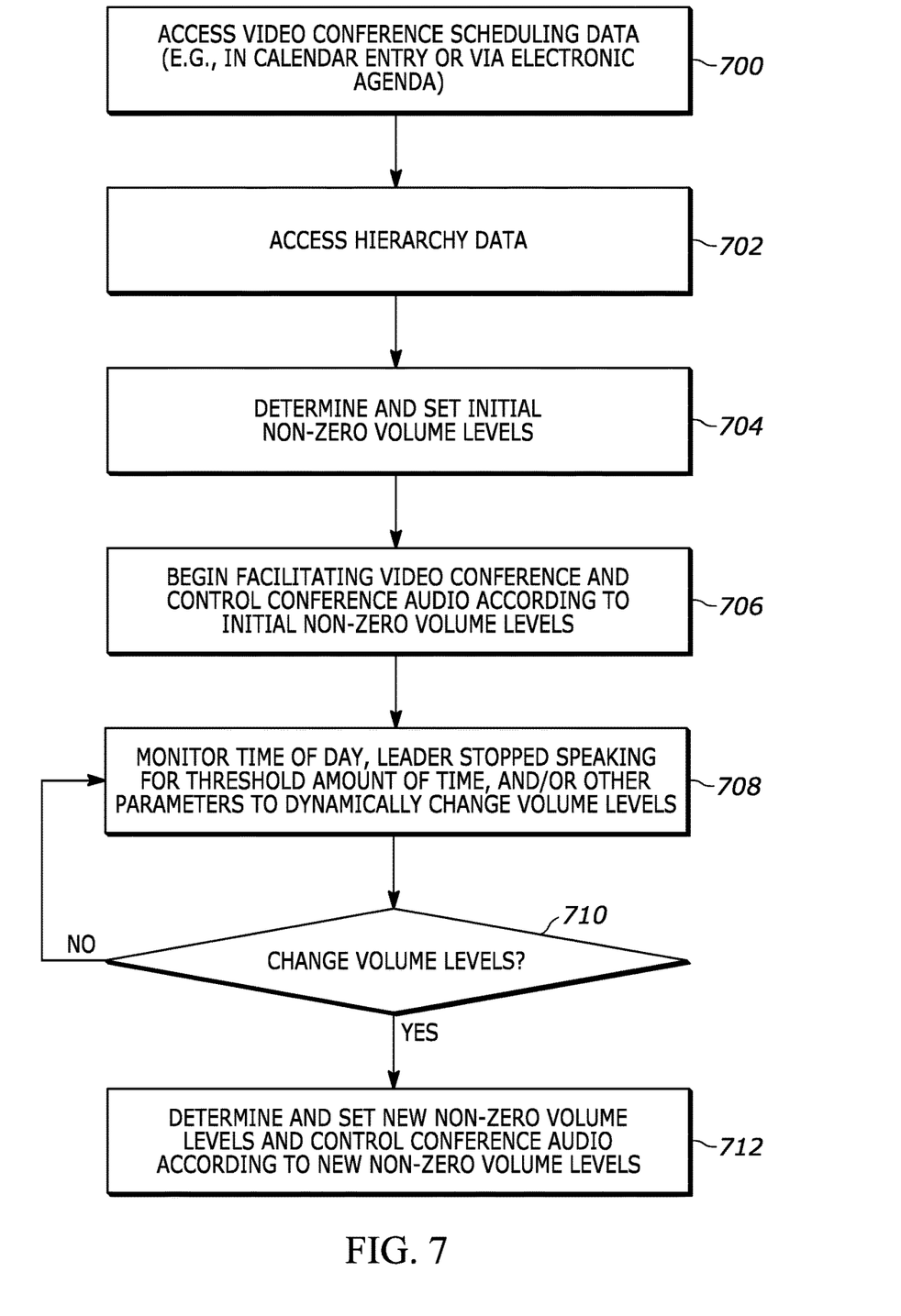
FIG. 7 illustrates example logic in example flow chart format that may be executed by a device consistent with present principles.

Before moving on to the description of FIG. 7, further note in relation to FIG. 6 that a GUI similar to the GUI 600 may be presented at each respective participant's device to indicate the current volume levels of other participants. For example, a similar GUI may be presented on each student's device. However, those GUIs might not include the selector 610, which may only be presented at the device of the conference organizer, presenter, person in charge, etc. so that that person may maintain control over volume levels for each participant.

Also note that the GUI 300 of FIG. 3 showing the various video feeds of various participants may be incorporated into either of the GUIs 500, 600 as well and that those sections were omitted from FIGS. 5 and 6 for simplicity.

Continuing the detailed description in reference to FIG. 7, it shows example logic consistent with present principles that may be executed by a device such as the system 100, a video conference participant's own personal device (e.g., smartphone or laptop), and/or a server or cloud computer facilitating the video conference, in any appropriate combination. Beginning at block 700, the device may access video conference scheduling data as may be located in an electronic calendar entry for a video conference that is to take place, or as may be located in a separate electronic agenda. The calendar entry or agenda may have been created by the conference organizer either in the video conferencing system itself or in a separate software application that may then be linked to the video conferencing system for the video conferencing system to use it.

The logic may then proceed to block 702 where the device may access hierarchy data, such as data indicating different assigned roles for the different conference participants. For example, the different assigned roles may be associated with different levels of an organizational hierarchy specified or provided by the conference organizer. The hierarchy data that is accessed might indicate that different conference participants have different rankings higher or lower than other participants, for example, which the device may then use to determine different non-zero volume levels at which the respective audio for the respective participant should be set (or even a volume level of zero in some examples for lower or lowest-ranking participants of the conference). For example, a preconfigured relational database may be accessed that indicates different volume levels for different rankings.

After block 702 the logic may proceed to block 704. At block 704 the device may determine and set the initial (possibly non-zero) volume level for each participant and then, at block 706, begin facilitating the video conference.

Thus, if the logic is being executed by a participant's own personal device, at block 706 the device may begin streaming audio and video from its microphone and camera, respectively, to other conference participants as possibly routed through the server hosting the video conferencing system. In some examples, the device may even specifically control outbound audio for the respective participant based on that participant's assigned volume level. Also, at block 706 as part of facilitating the video conference, the device may control its speakers to produce the audio of other remotely-located conference participants according to the respective remotely-located participants' own respective volume levels.

If the logic is being executed by the server/video conferencing system instead, then at block 706 the device may begin receiving respective audio and video streams from the respective participants' devices, and then merge and route those streams to other conference participants. In some examples, the server may specifically control the volume level at which audio for each of the participants will be produced at other respective participant devices based on a given participant's assigned volume level. For example, the server may control each respective copy of the conferencing service's application as executing locally at each respective participant's device to produce audio locally at the appropriate volume levels. Additionally, or alternatively, the server may adjust the volume level of the audio at the server at the mixing stage prior to the merged audio being provided to a given participant device so that the merged audio already contains the audio of the other participants at their respective volume levels.

From block 706 the logic may then proceed to block 708. At block 708 the device may monitor various things to determine if it should dynamically change the various volume levels set for the conference participants.

For example, at block 708 the device may monitor the current time of day to determine whether a scheduled and/or predetermined point in the conference has been reached at which the conference is to switch to another segment that may result in the volume level for each participant being set differently. As another example, the device may execute a digital assistant, speech to text software, and/or natural language processing to determine that, even if a scheduled point in the conference has not been reached based on the current time of day, the conference organizer has spoken words indicating the transition to the next segment of the conference anyway (e.g., the teacher 400 has stated "Okay, let's move on to questions", which may be recognized as a transition to another scheduled segment that the electronic calendar or agenda indicates as including the keyword "question").

The device may also monitor for still other things at block 708 to dynamically determine whether one or more volume levels should be raised or lowered, including other triggers described herein. For example, rather than the conference organizer specifying to the system one or more static volume levels for various participants to be maintained throughout the conference, the device may monitor for a currently-speaking person to have stopped speaking for a threshold amount of time as described above, in which case the volume levels of other participants may be raised. At block 708 the device might also monitor for selection of one of the selectors 510, 610 described above.

The logic of FIG. 7 may then proceed to decision diamond 710 where, based on the monitoring performed at block 708, the device may determine whether to vary/change one or more of the volume levels set for the participants as described herein (e.g., based on a predetermined point in the conference being reached, or based on one of the participants no longer speaking for the threshold amount of time). A negative determination at diamond 710 may cause the logic to revert back to block 708 to continue the monitoring. However, an affirmative determination at diamond 710 may instead cause the logic to proceed to block 712 where the volume levels may be changed as set forth above.

For example, at block 710 the logic may set all volume levels for the various participants to be equal during an open discussion segment of the conference or a question and answer segment. Or at block 710 the device may adjust the volume level for the various participants so that, based on the monitoring, any time a higher-ranking conference participant is identified as currently speaking then that person's audio is set to a higher volume output level than lower-ranking participants (e.g., regardless of which segment the conference is currently in).

Figure 8:
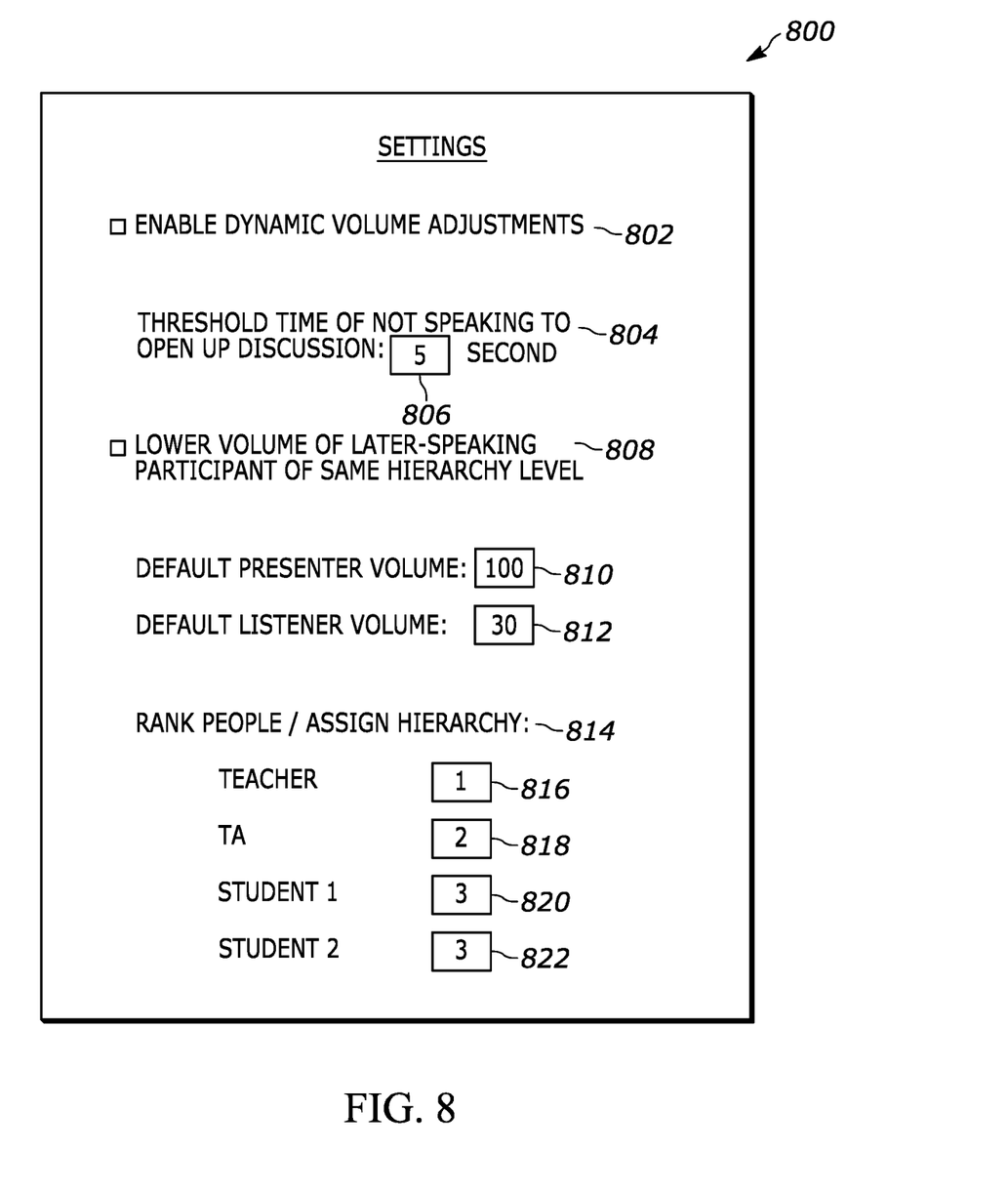
FIG. 8 shows an example GUI that may be presented on a display to configure one or more settings of a device or video conferencing system to operate consistent with present principles.

Now in reference to FIG. 8, it shows an example GUI 800 that may be presented on the display of any device programmed to undertake present principles. The GUI 800 may be presented upon user command, for example, in order to configure one or more settings of the device or conferencing system itself (e.g., hosted at a server) to operate consistent with present principles.

For example, the GUI 800 may include a first option 802 that may be selectable by selecting the adjacent check box in order to set or enable the device to undertake present principles. E.g., the option 802 may be selected a single time to set or configure the device to in the future execute the functions described above in reference to FIGS. 3-6 as well as to execute the logic of FIG. 7 for one or even plural different conferences.

The GUI 800 may also include a section 804 at which a user can set the threshold time for a participant not speaking as described above, after which volume levels for other participants may be raised. Thus, an end-user may direct input to input box 806 in order to set the threshold time as desired, and in the present example the threshold has been set to five seconds.

The GUI 800 may also include an option 808 that may be selectable via the adjacent check box in order to set or enable the device to specifically perform the function of lowering the volume level of a later-speaking participant of a same rank or hierarchical level if that participant and another were speaking at the same time, but the other participant started speaking first as described above. Also, if desired the GUI 800 may include an input box 810 at which a default volume level for a higher-ranked participant or presenter participant can be set, and a box 812 at which a default volume level for lower-ranked or listener participants can be set during the same segment. E.g., the input boxes may be used to specify the initial volume levels for the participants of the initial segment of the conference described above in reference to FIG. 4. Thus, consistent with that example, the default presenter volume has been set to 100 (e.g., for the teacher 400 or TA 402) and the default listener volume has been set to 30 (e.g., for the students 406). However, also note that the defaults might have been previously set or configured by a software developer or system administrator as well.

Additionally, if desired the GUI 800 may include a section 814 at which one or more conference participants can be ranked for an upcoming conference or for plural future conferences. Accordingly, a respective input box 816-822 may be presented next to the respective text denoting the respective participant so that a user can establish a numerical ranking for each participant. In this example, lower numbers correspond to higher rankings. Thus, using the example of FIGS. 4-6, the teacher 400 may have been assigned the highest rank of one, the TA may have been assigned a lower rank of two, and two different students may have each been assigned an even lower rank of three.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. At least a first device, comprising:
at least one processor; and
storage accessible to the at least one processor and comprising instructions executable by the at least one processor to:
facilitate a video conference;
determine different non-zero volume levels at which audio for different conference participants should be set, each different non-zero volume level being greater than zero, the determination of the different non-zero volume levels being based on a predetermined point in the video conference being reached and being based on different roles for at least two of the different conference participants as indicated in organizational hierarchy data accessible to the at least one processor, wherein the predetermined point is identified by the at least first device from one or more of: an electronic agenda associated with the video conference, an electronic calendar entry associated with the video conference;

monitor the video conference to determine that the predetermined point in the video conference has been reached;

based on the determination that the predetermined point in the video conference has been reached, control audio for the video conference according to the different non-zero volume levels;

present a first graphical user interface (GUI) on a display, the first GUI indicating the different non-zero volume levels; and present a second GUI on the display, the second GUI being different from the first GUI, the second GUI being a settings GUI for configuring one or more settings related to video conferencing.

2. The at least first device of claim 1, wherein different non-zero volume levels at which audio for the different conference participants should be set are also determined based on a current time of day.

3. The at least first device of claim 1, wherein the predetermined point is identified by the at least first device from the electronic agenda associated with the video conference.

4. The at least first device of claim 3, wherein the electronic agenda indicates respective amounts of time that respective segments of the video conference are scheduled to take.

5. The at least first device of claim 3, wherein the electronic agenda indicates respective times of day at which respective segments of the video conference are scheduled to begin.

6. The at least first device of claim 1, wherein the predetermined point is identified by the at least first device from the electronic calendar entry associated with the video conference, the electronic calendar entry being entered into an electronic calendar.

7. The at least first device of claim 6, wherein the electronic calendar entry is accessed by the at least first device based on a video conferencing system that facilitates the video conference being provided access to the electronic calendar entry.

8. The at least first device of claim 6, wherein the electronic calendar entry indicates respective amounts of time that respective segments of the video conference are scheduled to take.

9. The at least first device of claim 6, wherein the electronic calendar entry indicates respective times of day at which respective segments of the video conference are scheduled to begin.

10. The at least first device of claim 1, wherein the instructions are executable to:

present a selector on the display, the selector being selectable a single time to adjust the different non-zero volume levels from respective first different non-zero volume levels to respective second different non-zero volume levels.

11. The at least first device of claim 1, wherein the second GUI comprises a first option that is selectable to set the at least one processor to execute the steps of: facilitating the video conference, determining the different non-zero volume levels, monitoring the video conference, controlling the audio, and presenting the first GUI.

12. The at least first device of claim 11, wherein the first option is selectable a single time to set the at least one processor to, for multiple future video conferences, execute the steps of: facilitating the video conference, determining the different non-zero volume levels, monitoring the video conference, controlling the audio, and presenting the first GUI.

13. A method, comprising:

facilitating a video conference;

determining different non-zero volume levels at which audio for different conference participants should be output, wherein the different non-zero volume levels are determined based on different roles for at least two of the different conference participants as indicated in organizational hierarchy data and based on a predetermined point in the video conference being reached, wherein the predetermined point is identified from one or more of: an electronic agenda for the video conference, an electronic calendar entry for the video conference;

monitoring the video conference to determine that the predetermined point in the video conference has been reached;

based on the determining that the predetermined point in the video conference has been reached, controlling audio for the video conference according to the different non-zero volume levels;

presenting a first graphical user interface (GUI) on a display, the first GUI indicating the different non-zero volume levels; and presenting a second GUI on the display, the second GUI being different from the first GUI, the second GUI being a settings GUI for configuring one or more settings related to video conferencing.

14. The method of claim 13, comprising:

presenting a selector on the display, the selector being selectable a single time to adjust the different non-zero volume levels from respective first different non-zero volume levels to respective second different non-zero volume levels.

15. The method of claim 13, wherein the second GUI comprises a first option that is selectable to set at least one device to execute the steps of: facilitating the video conference, determining the different non-zero volume levels, monitoring the video conference, controlling the audio, and presenting the first GUI.

16. The method of claim 13, wherein the predetermined point is identified from the electronic agenda for the video conference.

17. The method of claim 16, wherein the electronic agenda indicates respective amounts of time that respective segments of the video conference are scheduled to take.

18. The method of claim 16, wherein the electronic agenda indicates respective times of day at which respective segments of the video conference are scheduled to begin.

19. At least one computer readable storage medium (CRSM) that is not a transitory signal, the computer readable storage medium comprising instructions executable by at least one processor to:

determine different volume levels at which audio for different video conference participants of a video conference should be set, each different volume level being greater than zero, the determination of the different volume levels being based at least in part on different roles for at least two of the different video conference participants as indicated in organizational hierarchy data, the determination of the different volume levels also being based at least in part on identification by the at least one processor of one or more of: a predetermined point being reached as indicated in an electronic agenda for the video conference, a predetermined point being reached as indicated in an electronic calendar entry for the video conference;

monitor the video conference to determine that the predetermined point in the video conference has been reached;

based on the determination that the predetermined point in the video conference has been reached, set audio for a first video conference participant at a first non-zero volume level and set audio for a second video conference participant at a second non-zero volume level;

present a first graphical user interface (GUI) on a display, the first GUI indicating the first non-zero volume level and the second non-zero volume level; and present a second GUI on the display, the second GUI being different from the first GUI, the second GUI being a settings GUI for configuring one or more settings related to video conferencing.

20. The CRSM of claim 19, wherein the second GUI comprises a first option that is selectable to set the at least one processor to execute the steps of: determining the different volume levels, monitoring the video conference, setting the audio, and presenting the first GUI.

* * * * *